(12) United States Patent
Lewis et al.

(10) Patent No.: US 8,763,582 B2
(45) Date of Patent: Jul. 1, 2014

(54) ENGINE STARTING FOR ENGINE HAVING ADJUSTABLE VALVE OPERATION AND PORT FUEL INJECTION

(75) Inventors: Donald J. Lewis, Howell, MI (US); Nate Trask, Dearborn, MI (US); Vince Winstead, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1742 days.

(21) Appl. No.: 11/399,264

(22) Filed: Apr. 5, 2006

(65) Prior Publication Data

US 2006/0254564 A1    Nov. 16, 2006

Related U.S. Application Data

(63) Continuation-in-part of application No. 11/128,663, filed on May 12, 2005, now Pat. No. 7,278,388, and a continuation-in-part of application No. 11/128,664, filed on May 12, 2005.

(51) Int. Cl.
*F02D 13/06* (2006.01)
*F02D 41/06* (2006.01)
*F02D 41/04* (2006.01)
*F02N 11/08* (2006.01)
*F02M 69/04* (2006.01)

(52) U.S. Cl.
CPC ............ *F02D 41/042* (2013.01); *F02D 41/062* (2013.01); *F02D 13/06* (2013.01); *F02N 11/0803* (2013.01); *F02M 69/044* (2013.01)
USPC .............. 123/179.5; 123/179.17; 123/179.16; 123/406.53; 123/491; 123/322

(58) Field of Classification Search
CPC ...... F01L 9/04; F01L 2800/01; F02D 13/023; F02D 41/042; F02D 41/062; F02D 13/06; F02D 41/0087; F02D 2013/0292; F02N 11/0803; F02M 69/044; F02M 69/046
USPC ........................ 123/179.1–179.5, 179.16, 21, 123/90.15–90.17, 322, 198 DB, 406.53, 123/685, 491, 179.9, 182.1; 701/102–104; 60/299, 264, 301, 305, 285
See application file for complete search history.

(56) References Cited

U.S. PATENT DOCUMENTS

| | | | | |
|---|---|---|---|---|
| 4,811,231 A * | 3/1989 | Hataoka et al. | ............... | 701/103 |
| 6,098,585 A * | 8/2000 | Brehob et al. | ............. | 123/179.5 |
| 6,394,051 B1 * | 5/2002 | Filipe et al. | ................ | 123/90.15 |
| 6,536,393 B2 * | 3/2003 | Novak et al. | ............... | 123/182.1 |
| 6,588,397 B1 | 7/2003 | Sieber | | |
| 6,647,955 B1 | 11/2003 | Sieber | | |
| 6,739,300 B2 | 5/2004 | Ackermann et al. | | |
| 6,799,547 B2 | 10/2004 | Sieber | | |
| 6,981,481 B2 * | 1/2006 | Kojima et al. | ............. | 123/179.3 |
| 7,063,062 B2 * | 6/2006 | Lewis et al. | ................ | 123/198 F |
| 7,079,935 B2 * | 7/2006 | Lewis et al. | ................... | 701/102 |
| 7,107,947 B2 * | 9/2006 | Lewis et al. | ............... | 123/90.11 |

(Continued)

*Primary Examiner* — Lindsay Low
*Assistant Examiner* — Kevin Lathers
(74) *Attorney, Agent, or Firm* — Julia Voutyras; Alleman Hall McCoy Russell & Tuttle LLP

(57) ABSTRACT

A method for controlling an engine during a start is presented. In one example, the method includes direct starting an engine with a port fuel injector. The method can improve engine starting during some conditions.

21 Claims, 8 Drawing Sheets

(56) References Cited

U.S. PATENT DOCUMENTS

| | | | |
|---|---|---|---|
| 7,128,687 B2 * | 10/2006 | Lewis | 477/98 |
| 7,165,391 B2 * | 1/2007 | Lewis | 60/285 |
| 7,165,520 B2 * | 1/2007 | Lewis et al. | 123/90.15 |
| 7,194,993 B2 * | 3/2007 | Lewis et al. | 123/179.16 |
| 7,213,548 B2 * | 5/2007 | Lewis et al. | 123/90.11 |
| 7,234,435 B2 * | 6/2007 | Lewis et al. | 123/198 F |
| 7,320,300 B2 * | 1/2008 | Lewis et al. | 123/179.16 |
| 7,383,820 B2 * | 6/2008 | Lewis et al. | 123/491 |
| 7,401,606 B2 * | 7/2008 | Lewis et al. | 123/685 |
| 2004/0149247 A1 * | 8/2004 | Kataoka et al. | 123/179.4 |
| 2004/0200448 A1 * | 10/2004 | Kojima et al. | 123/179.3 |
| 2005/0211194 A1 * | 9/2005 | Hanson et al. | 123/21 |
| 2006/0090721 A1 * | 5/2006 | Brehob et al. | 123/179.5 |

* cited by examiner

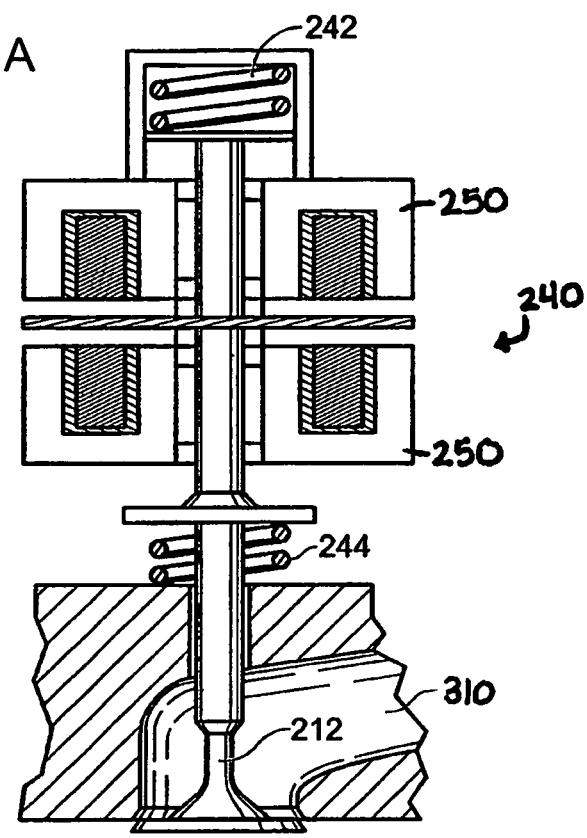

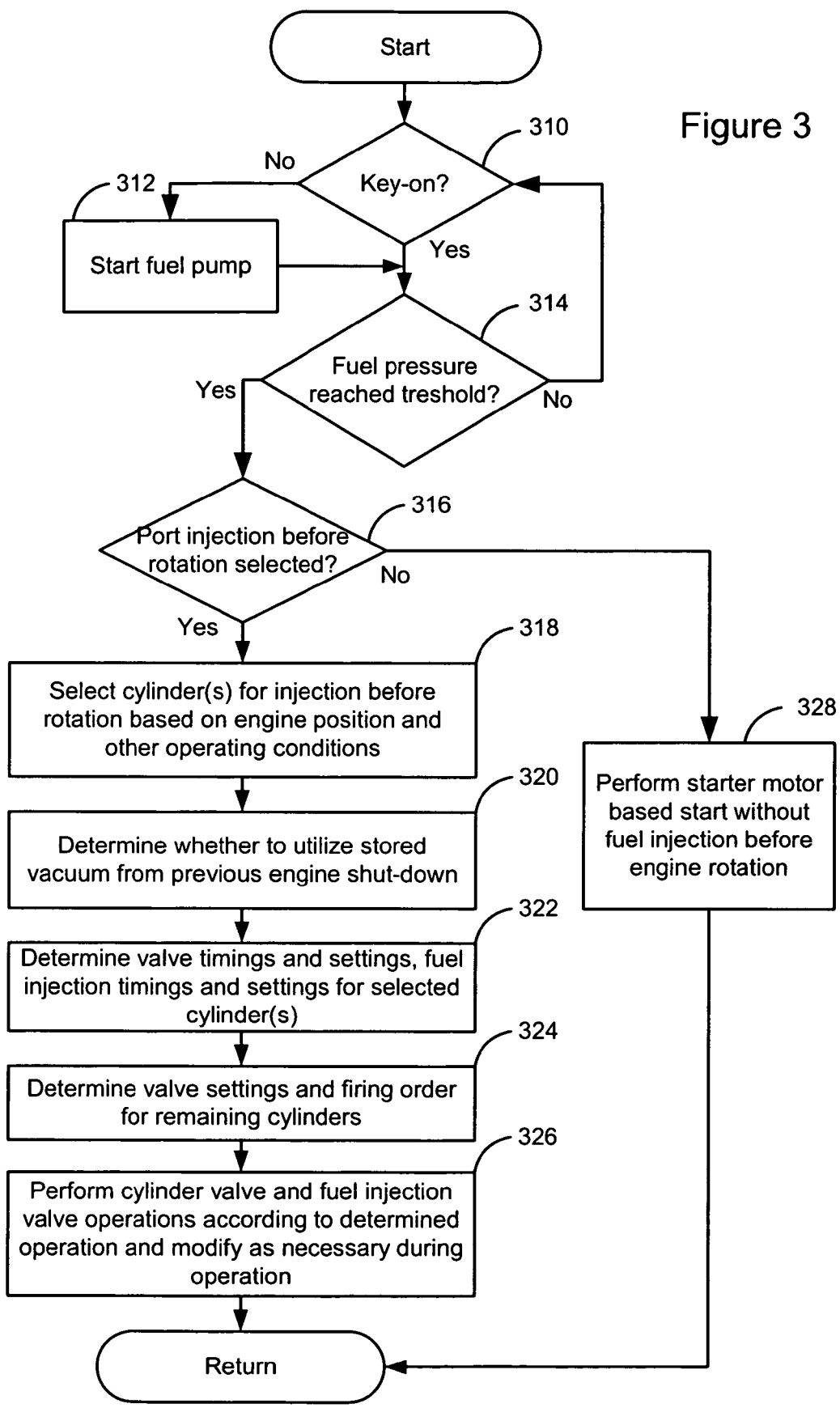

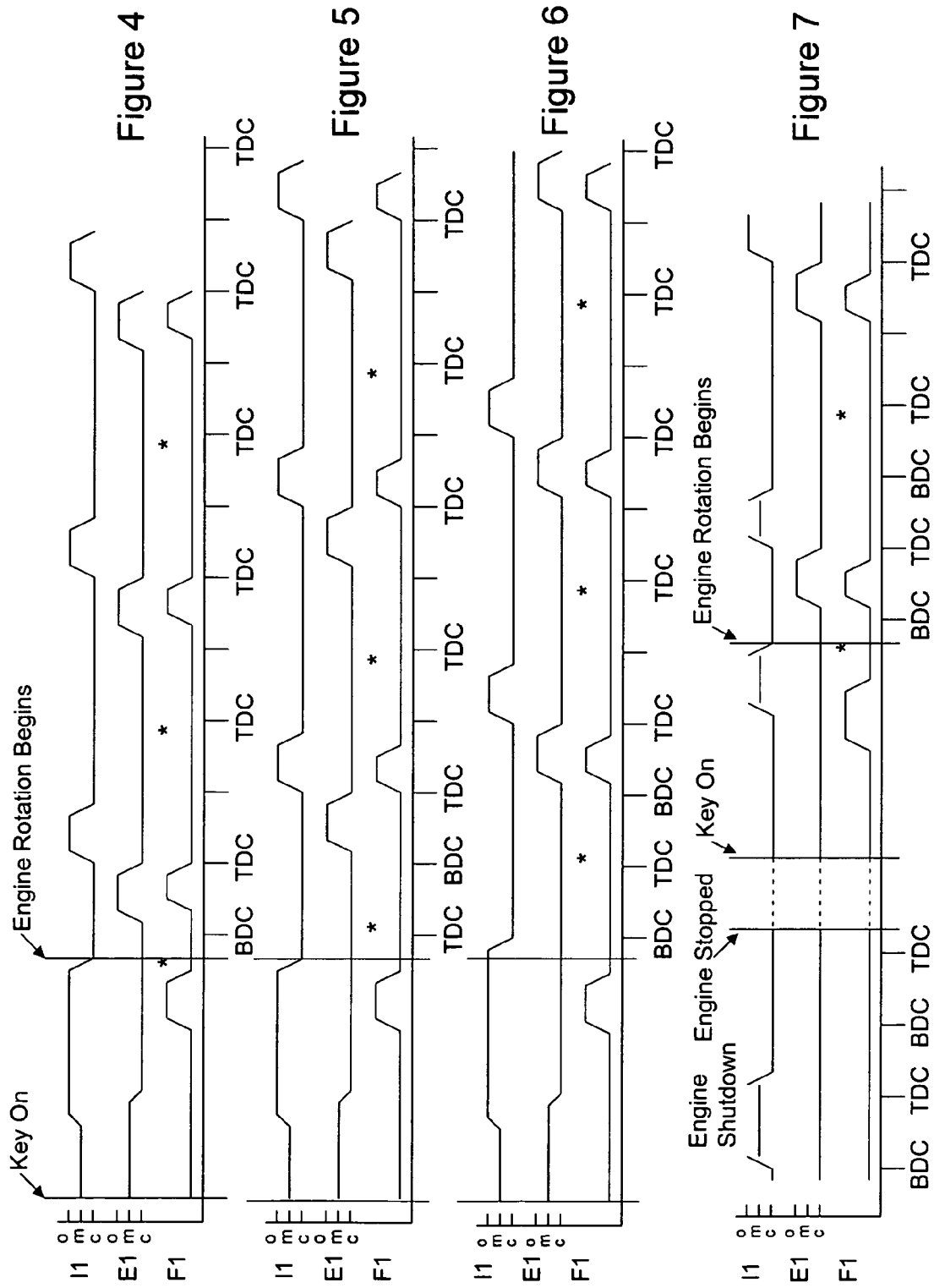

ENGINE STARTING FOR ENGINE HAVING ADJUSTABLE VALVE OPERATION AND PORT FUEL INJECTION

The present application is a continuation-in-part of U.S. patent application Ser. No. 11/128,663 now U.S. Pat. No. 7,278,388 and Ser. No. 11/128,664, filed May 12, 2005, the entire contents of each of which are incorporated herein by reference in their entirety.

FIELD

The present description relates to a method for improving staring of an internal combustion engine and more particularly to a method for controlling electromechanical intake and/or exhaust valves during engine shut-down and/or re-starting.

BACKGROUND AND SUMMARY

Engine cylinders for passenger vehicles may have one or more electrically actuated intake and/or exhaust valves. These electrically actuated valves can operate independently of a crankshaft and/or piston position, for example. Various modes of operating these valves may be provided for improving engine control and/or emission reduction.

One approach that uses adjustable valve operation to provide faster engine starting adjusts injection timing of direct injection fuel injection. For example, direct starting may be provided using such operation, where the cylinder spark is initiated to start engine rotation and thus remove the starter. Further, in another example, such operation can be used to reduce the size a starter motor, or to increase starting speed. Thus, the initial combustion may occur at rest or very low speeds.

However, the inventors herein have recognized several issues with such approaches. First, direct injection fuel system can add significant cost due to higher fuel injection pressure, the unfriendly environment of the combustion chamber for the injector, and requirement for additional packaging space. However, in the above systems, direct injection is utilized to provide fuel to the cylinder before rotation, and thus appears to be a required component.

To address the above issues, a method is provided for controlling an engine during a start, the method comprising: before rotation of the engine: opening an intake valve of at least one cylinder and starting injection of fuel from a port injector coupled to the cylinder so that at least some fuel enters the cylinder; closing the intake valve; and performing a spark in the at least one cylinder.

In this way, it is possible to utilize port injection to provide fuel to a cylinder before engine rotation begins, yet reduce reliance on direct injection.

BRIEF DESCRIPTION OF THE DRAWINGS

FIG. 1A is a schematic diagram of an engine valve;
FIGS. 2-3 are flowcharts of various methods to control engine operation;
FIGS. 4-9 are plots of example valve timing during engine starting.

DETAILED DESCRIPTION

Figure 1:
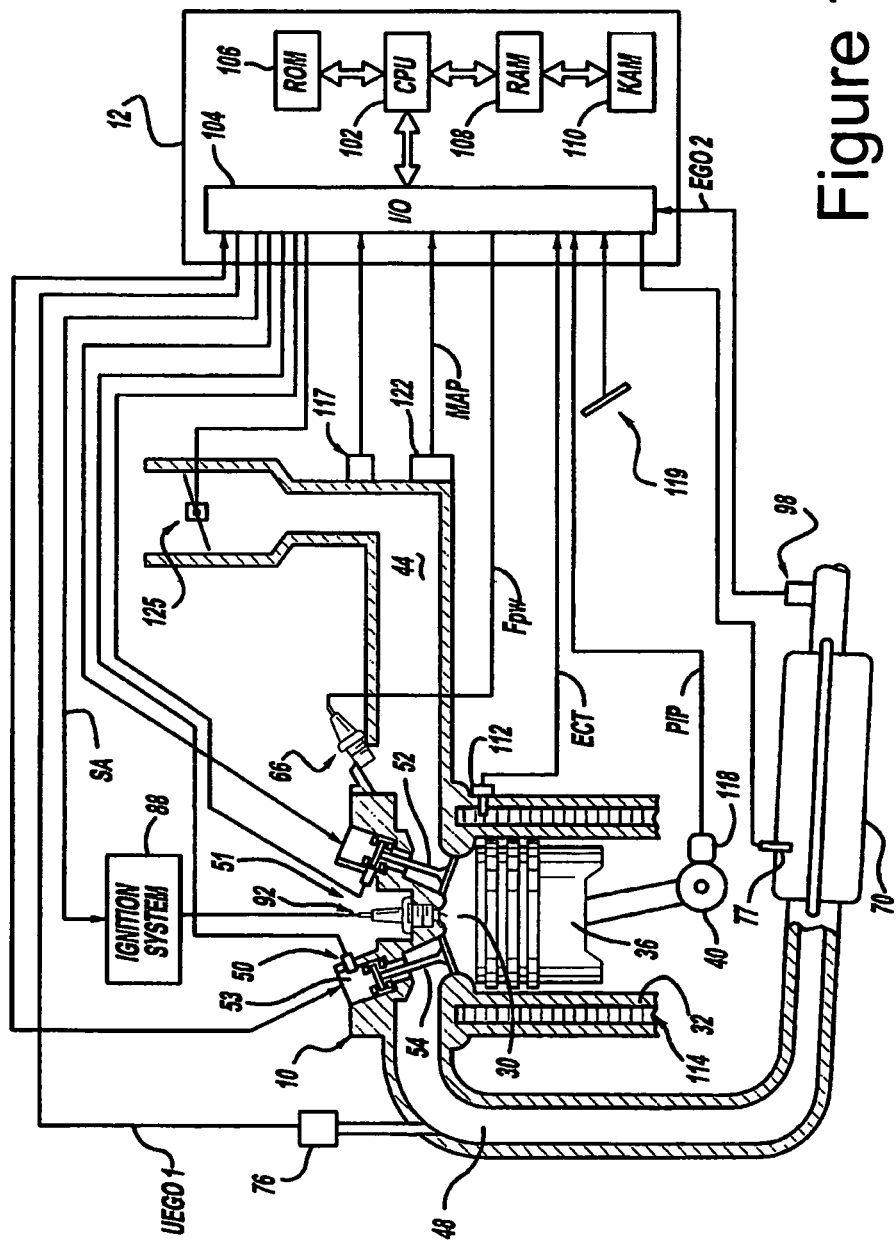
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 an exhaust valve 54. Each intake and exhaust valve is operated by an electromechanically controlled valve coil and armature assembly 53, such as shown in FIG. 1A. Armature temperature is determined by temperature sensor 51. Valve position is determined by position sensor 50. In an alternative example, each of valves actuators for valves 52 and 54 has a position sensor and a temperature sensor. In still another alternative, one or more of intake valve 52 and/or exhaust valve 54 may be cam actuated, and be capable of mechanical deactivation. For example, lifters may include deactivation mechanism for push-rod type cam actuated valves. Alternatively, deactivators in an overhead cam may be used, such as by switching to a zero-lift cam profile. In still another alternative, intake valves may be cam actuated with mechanical deactivation and intake valves may be electrically actuated.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only memory 106, random access memory 108, 110 keep alive memory, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

In an alternative embodiment, a direct injection type engine can be used where injector 66 is positioned in combustion chamber 30, either in the cylinder head similar to spark plug 92, or on the side of the combustion chamber. Also, the engine may be coupled to an electric motor/battery system in a hybrid vehicle. The hybrid vehicle may have a parallel configuration, series configuration, or variation or combinations thereof.

While not shown in FIG. 1, an optional starter motor/alternator assembly may be coupled to the engine via crankshaft 40. The engine starter motor may be of reduced size if used in combination with various of the self-starting engine routines described below. Alternatively, no starter motor may be used. For example, in one example, the engine may have a starter motor, yet utilize direct cylinder starting if the battery power has reduced to a value where the motor cannot rotate the engine sufficiently, but yet has sufficient power to actuator the fuel injectors, electric valves, and fuel pump. Also, engine pre-positioning may be used where engine position is controlled during a previous shut-down to position the engine in a desired location that improves self-starting. Further still, engine stopping position can be stored and saved and then used during subsequent starts.

In yet another example, the level of starter motor torque applied may be variable, and decreased by a controller when using pre-injection of port injected fuel before rotation.

FIG. 1A shows an example dual coil oscillating mass actuator 240 with an engine valve actuated by a pair of opposing electromagnets (solenoids) 250, 252, which are designed to overcome the force of a pair of opposing valve springs 242 and 244. FIG. 1A also shows port 310, which can be an intake or exhaust port). Applying a variable voltage to the electromagnet's coil induces current to flow, which controls the force produced by each electromagnet. Due to the design illustrated, each electromagnet that makes up an actuator can only produce force in one direction, independent of the polarity of the current in its coil. High performance control and efficient generation of the required variable voltage can therefore be achieved by using a switch-mode power electronic converter. Alternatively, electromagnets with permanent magnets may be used that can be attracted or repelled.

As illustrated above, the electromechanically actuated valves in the engine remain in a mid-open position when the actuators are de-energized. Therefore, prior to engine combustion operation, each valve may go through an initialization cycle. During the initialization period, the actuators may be pulsed with current, in a prescribed manner, in order to establish the valves in the fully closed or fully open position, if desired. Following this initialization, the valves are sequentially (or non-sequentially) actuated according to the desired valve timing (and firing order) by the pair of electromagnets, one for pulling the valve open (lower) and the other for pulling the valve closed (upper), as described in more detail herein.

The magnetic properties of each electromagnet are such that only a single electromagnet (upper or lower) need be energized at any time. Since the upper electromagnets hold the valves closed for the majority of each engine cycle, they are operated for a much higher percentage of time than that of the lower electromagnets.

While FIG. 1A appears show the valves to be permanently attached to the actuators, in practice there can be a gap to accommodate lash and valve thermal expansion.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

Figure 2:
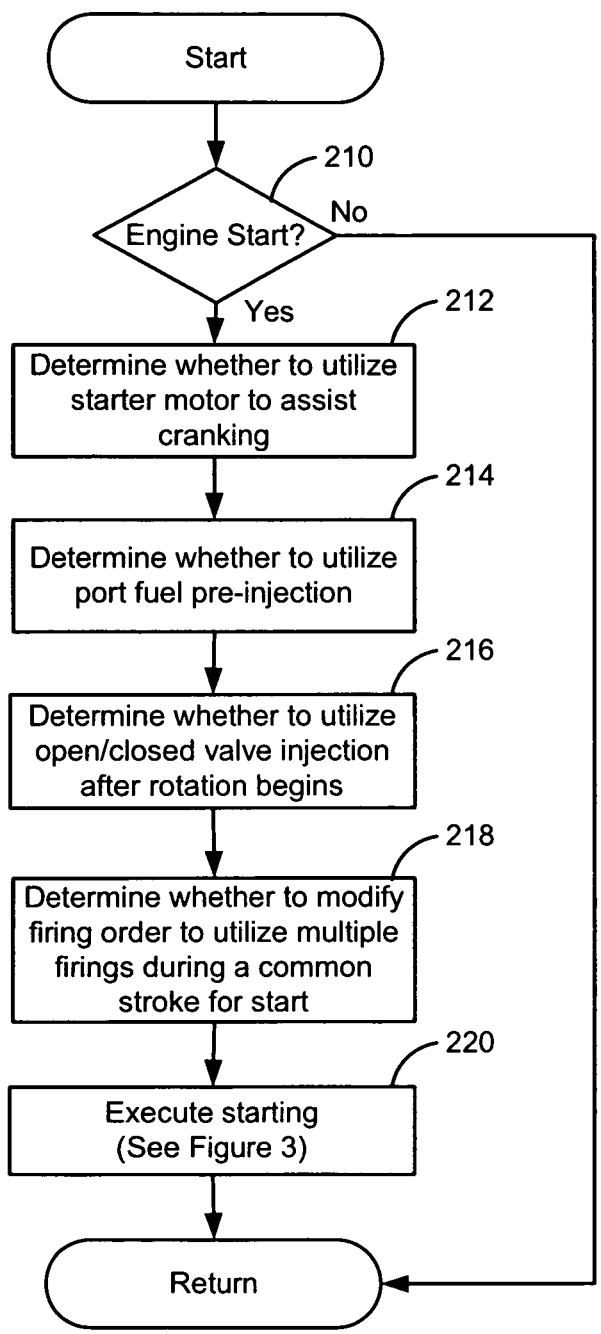

Referring now to FIGS. 2-3, various routines are described for controlling engine starting. The features described below may be used alone or in combination with other features described herein. The starting may be a vehicle start (such as key-on), an engine start or re-start such as in a hybrid powertrain, or a partial engine start (e.g., one or more cylinder starting or re-starting). Specifically, the routines may be used for controlling an engine in which, during selected engine starts, electrically actuated valves are used with port fuel injectors to achieve faster engine starting, or engine starting with reduced reliance on a starter motor, or both.

First, in 210, the routine determines whether an engine start is being performed. If so, the routine continues to 212 to determine whether to utilize start motor to assist cranking of the engine. Various factors may be used in making such a determination, such as, for example, low engine coolant temperature conditions, engine stopping location, barometric pressure, battery voltage, others, and/or combinations thereof. For example, during lower temperatures or barometric pressures, starter motor assistance may be used to a greater extend than during higher temperature or barometric pressures.

Next, in 214, the routine determines whether to utilize port fuel injection before engine rotation begins, and if so, in which cylinder or cylinders such action may be taken. Various factors may be used in making such a determination, such as, for example, engine stopping location, whether starter motor assistance is present, and the extent of such assistance, temperature, barometric pressure, battery voltage, others, and/or combinations thereof. For example, port fuel injection may be started before engine rotation in selected cylinders when sufficient air is present to burn fuel to generate sufficient starting torque for rotating the engine enough so that subsequent cylinders can be fueled and combusted. The examples below illustrate these and other approaches that may be used.

Next, in 216, the routine determines whether to utilize open and/or closed valve injection, or combinations thereof, for subsequently firing cylinders after rotation begins. Various factors may be used in making such a determination, such as, for example, the number of engine combustion events that have occurred, engine temperature, whether starter motor assistance is present, and the extent of such assistance, barometric pressure, battery voltage, others, and/or combinations thereof. For example, open valve injection may be used for the cylinder or cylinders combusting from rest in order for fuel to be provided to the combustion chamber without performing an intake stroke, but for later cylinders, closed intake valve port fuel injection may be used. Alternatively, a combination of open and closed intake valve injection may be used for some cylinders during the engine run-up. Further, the examples below illustrate various approaches that may be used.

Next, in 218, the routine determines whether to modify the engine firing order to utilize multiple firings during a common stroke during the engine start. For example, the approach described in U.S. Ser. No. 11/128,663 and Ser. No. 11/128,664, noted above herein, may be used, if desired under some conditions, such as based on engine temperature, engine stopping location, and/or others.

The selection of the above features may be performed once during an engine start, or re-evaluated as the engine start progresses. Next, the routine continues to 220 and executes the starting routine of FIG. 3.

Referring now to FIG. 3, a routine is described for performing an engine start under various operating conditions. In 310, the routine determines whether a key-on condition is present. For example, the routine determines whether the driver has inserted and/or turned the vehicle key to a specified position. If so, the routine continues to 312 to start the fuel-pump, or take other actuation to pressurize the engine fuel rail, if necessary. Then, in 314, the routine determines whether sufficient fuel pressure has been achieved in the rail to deliver fuel via an injector or injectors. If not, the routine returns to 310, otherwise, it continues to 316.

In 316, the routine determines whether port injection before rotation has been selected for one or more cylinders via the determinations of FIG. 2. If so, the routine continues to 318 to select which cylinder or cylinders for receiving port fuel injection before rotation of the engine based on the engine stopped position and other operating conditions. For example, a cylinder or cylinders may be selected based on the volume of the cylinder in the stopped location, and the direction of travel that will occur once the engine is rotated. In this way, sufficient combustion torque may be produced in the cylinder with rotation in a desired direction. Further, a number of cylinders selected for such operation may be varied with operating conditions, such as a desired starting time, temperature, barometric pressure, stopping location, and various others or combinations thereof. Thus, under a first stopped engine position, a single cylinder may be selected for pre-injection, whereas under a second stopped engine position, one or two different cylinders may be selected for pre-injection.

Next, in 320, the routine determines whether to utilize stored vacuum from a previous engine shutdown. In other words, under selected engine shut-down conditions, a vacuum may be generated and stored in one or more cylinders to assist induction of fuel before engine rotation of subsequent starts. Thus, the routine may determined whether sufficient engine shut-down time has passes where the vacuum may have decreased, and thus may not be used. If vacuum is present and may be used, valve timing and fuel injection timing may be adjusted as described herein in various ways, such as by utilizing fuel injection before the intake valve opens (and before rotation), for example. Further, addition operations that may be used to store and utilize vacuum during engine shut-down and start-up is described in more detail below herein.

Continuing with FIG. 3, in 322 the routine determines valve timings and settings and fuel injection timings and settings for the cylinders selected in 318. In one example, the routine determines and/or adjusts valve opening and closing timings of intake and/or exhaust valves and the start and/or end timings of fuel injectors for the selected cylinders. Further, in 324, the routine determines the settings and timing of the remaining cylinder valves and injectors, along with the firing order. For example, other cylinders may be operated with some valves partially or fully open, with other valves held closed during a plurality of engine or cylinder cycles to reduce starting torque by avoid compression of trapped gasses, while also reducing a flow of gasses to the exhaust. One of the intake or exhaust valves may be selected to be open, with the other selected to be held closed, in one example, as described herein.

Finally, in 326, the routine performs the engine start, with or without starter motor assistance, with the determined settings and timings, and performs and/or modifies the settings during the start as noted herein.

Various examples of alternative timings and settings are described herein, such as with regard to FIGS. 4-8.

If the answer to step 316 is no, the routine continues to 328 to perform an engine start using the starter motor where fuel injection begins after engine rotation. Note however, that valve adjustments can still be used during the engine start to reduce starting torque and flow of gasses to the exhaust, such as by holding one of intake and exhaust valves open and the other closed during one or more engine cycles, such as described herein.

The above approach can be applied to various types of engines and can be adjusted to take into account variation of firing order, firing intervals, number of cylinders, etc. For example, it may be used with 2, 4, 6, or more cycle engines, V-type engines, in-line engines, opposed engines, W-type engines, or others. Further, it may be used with engines having 2, 3, 4, 6, 8, or more cylinders, and even may be used in engines where no two cylinders have a piston in the same relative position.

In particular, as the number of cylinders increases, it may be possible to provide more than one initial combustion event as selected in 218 to start the engine from rest, and further in such conditions, increasing (or decreasing) the number of strokes to return to a desired firing order can be done simultaneously in more than one cylinder, or the cylinders can be gradually 2-stroked (or 6-stroked, etc.) to spread any torque disturbance out over longer intervals to reduce any vehicle or engine vibration. Further, as the firing order changes, various adjustments can be made to which cylinder has the number of strokes changed and how such a transition occurs. Various examples are described in more detail in the Figures below.

Referring now to FIG. 4, it shows an example starting sequence of one cylinder of a port-fuel injection I4 4-cycle engine where direct starting without starter-motor assistance may be employed. In this example, the cylinder does not take advantage of any pre-stored vacuum, and starts port fuel injection during a closed intake valve event for subsequent firings of the cylinder.

The graph shows approximate relative trajectories of an intake valve (I1), and exhaust valve (E1), and a fuel injector (F1) for an example cylinder (labeled cylinder 1 in this example). Note that before engine rotation begins, the graph is shown over time, whereas after rotation begins, the graph is shown as a function of crank angle. When labeled as a function of engine position, TDC denotes piston position at "top dead center" and BDC denotes "bottom dead center" as is known in the art. Also, ignition timing is shown with an asterisk (*), where appropriate. The valves have three positions labeled on the axis, "o" for fully open, "c" for fully closed, and "m" for the mid, or neutral, position, which may be partially open. The graph of FIG. 4, and subsequent figures, is drawn approximately to scale, although is still an approximation and represents a prophetic example.

Specifically, in this example, after a key-on, or another indication to start the engine, the intake valve is moved away from its neutral position to open, and the exhaust valve is moved away from its neutral position to closed. The valve movement may be initiated a fixed time after key-on, at key-on, or when sufficient fuel pressure is obtained in the fuel rail. In one example, the intake and/or exhaust valve movement is staggered to reduce electrical loads on the battery. However, in another example, the valves may be moved substantially simultaneously. In this example, after the intake valve opening is increased, the fuel injection is started. Then, when sufficient fuel is provided (which as noted above may be based on the volume of the cylinder at its current (stopped) position), the injection is stopped and the intake valve is closed. While FIG. 4 shows the fuel injection completing before the closing of the intake valve, these may occur at substantially the same time in an alternative embodiment. Finally, a spark (*) is shown initiating the rotation of the engine.

After engine rotation begins, the valves are operated to generate four-stroke cycles with fuel injection occurring during a closed intake valve condition. Specifically, after rotation begins, the cylinder is in a power stroke, and then follows I-C-P-E (intake-compression-power-exhaust) four stroke cycling. Note that while the fuel injection is shown wholly during closed intake valves after rotation, the fuel injection may continue past opening of the intake valve depending on operating conditions, for example.

In this way, it may be possible to generate engine rotation without a start motor using port fuel injection and electrically actuated valves, for example.

Referring now to FIG. 5, it shows operation similar to that of FIG. 4, with several modifications. Specifically, this example shows a cylinder starting with assistance, such as from a starter motor or from torque generated in other cylinders performing a direct start such as in FIG. 4, for example. In other words, the intake and exhaust valves are moved and port fuel injection is provided to the cylinder before rotation, however, a spark is performed after rotation so that combustion occurs in the appropriate cycle, since the stopping location of cylinder 1 is different than that of FIG. 4. Thus, under some starting locations, such as that shown in FIG. 4, the spark may be performed before rotation (e.g., to initiate rotation) and under different starting locations, such as that shown in FIG. 4, the spark may be performed after rotation. Further, FIG. 5 shows open intake valve injection being used for subsequent combustion events after the first combustion event in the cylinder.

In the example of FIG. 5, after rotation begins, the cylinder moves through the latter part of a compression stroke and then performs a power stroke, and thus continues to follow I-C-P-E cycling.

Referring now to FIG. 6, it also shows still another example of operation similar to that of FIG. 4, with several modifications. In FIG. 6, although the stopped position is similar to that of FIG. 4, in this example the cylinder is shown starting with assistance, such as from a starter motor or from torque generated in other cylinders. In this case, the intake valve is held open until after engine rotation begins to enable induction of additional air. Further, the end of an intake stroke, and then a compression stroke is performed before performing a spark and the power stroke. Such an approach may be used to produce a combustion event in the cylinder earlier than otherwise possible if port fuel injection were performed after rotation began.

Referring now to FIG. 7, it shows yet another example of operation similar to that of FIG. 4, except that a previous engine shutdown is shown in which a vacuum is trapped in the cylinder. Specifically, during the engine shutdown, after fuel injection and combustion is stopped, the intake valve is opened and then closed such that a vacuum is stored in the cylinder. The vacuum level trapped in the cylinder may be adjusted by adjusting one or both of the opening and/or closing timing of the intake valve. Also, the exhaust valve may be used in place of, or in addition to, the intake valve to generate a vacuum. Further, while this example shows a single cylinder trapping a vacuum during a shutdown, multiple cylinders may be operated in such a manner.

Once the engine is stopped, dashed lines are used to show the positions during a stopped time (which may be referred to as an engine soak time), which is not drawn to scale. The soak time may be shorter, such as in the case of a hot re-start or during hybrid vehicle operation, or it may be longer, such as during a vehicle shutdown over a longer period of time. Note that the soak time may be estimated or measured and used to determine whether to utilize stored vacuum. For example, for longer soak times, the vacuum level may slowly degrade over time so that alternative starting approaches may be used depending on the soak duration when storing vacuum in the cylinders.

After key-on or another indication of a start, the intake valve and fuel injection timing (which is port injection in this example, although direction injection may also be employed) are adjusted to take advantage of the stored vacuum. Specifically, in this example, both open and closed intake valve injection are used for the initial injection before rotation. When the intake valve is opened, the vacuum assists in drawing in both air and port injected fuel so that after the valve is closed, a more robust and better mixed air and fuel combination may be combusted. Then, a spark is performed to generate a partial power stroke, followed by four stroke I-C-P-E cycling.

As noted above, the fuel injection start and/or end timing during the start may be varied with operating conditions, or may be varied to place the injected fuel near the intake valve before the valve opens so that any stored vacuum will generate sufficient shear to draw the fuel in the cylinder.

Figure 8:
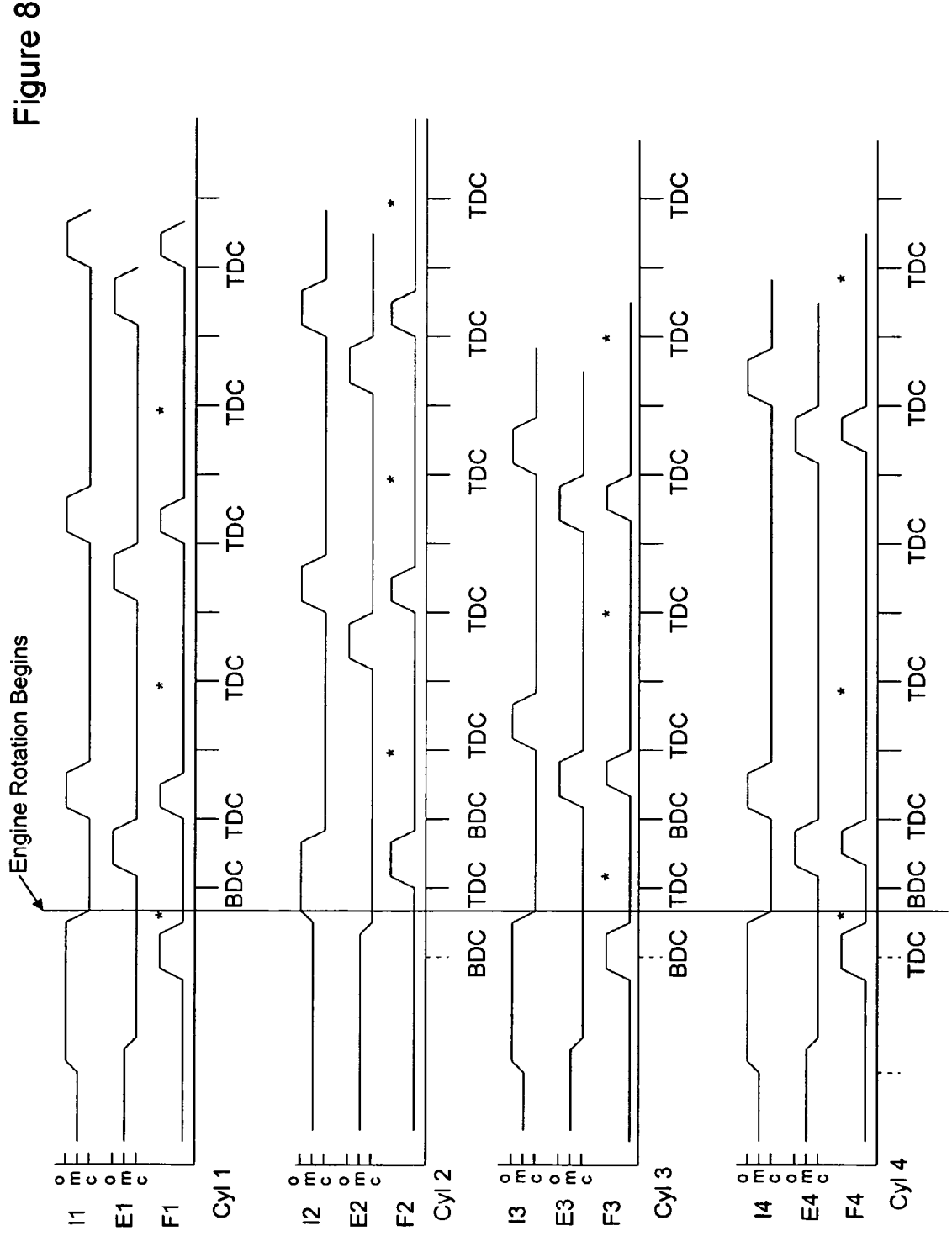

Referring now to FIG. 8, an example four cylinder engine is shown in which operation of all four cylinder is illustrated, thus illustrating how various features described may be combined and used to advantage. Specifically, in this example, cylinders 1 and 4 fire simultaneously to start the engine using port injection before rotation, and engine cylinder 4 performs 6-stroke operation to obtain a firing order of 1-3-4-2. The increased number of strokes may be carried out in various ways. For example, the cylinder may generate a double compression and double expansion of unburned gasses, while in another example, or during alternative operating conditions, a double compression/expansions of burned gasses may be used. Either approach may be used, along with various others. For example, one or more of double compression, double intake, and/or double exhaust before induction may be used.

Also, in FIG. 8, cylinder 3 is also operated with injection before rotation so that it can perform combustion without waiting for an intake stroke (i.e., unlike cylinder 2 which uses an induction cycle). Note that, as described above, the timing of the closing of the intake valve could be delayed until after rotation begins to trap a smaller amount of air and/or fuel in the cylinder. While this may provide less torque when it is combusted, it also may reduce required starting torque by requiring less compression force. In one example, the timing for the closing of the intake (and/or exhaust) valve may be adjusted to provide a minimum amount of air and fuel for reliable combustion, but less than a maximum amount of air that would require to great a compression force.

In an alternative embodiment, each of cylinders 1, 2, and 3 could be operated with 6 strokes (or 2 strokes), and cylinder 4 left in its cycle, to eventually obtain a firing order of 1-3-4-2. Further, combinations of 2-stroke operation on some cylinders and 6-stroke operation on others could also be used. The variation in strokes may be set to occur at selected engine speeds, a selected time from start, or after a selected number of combustion events.

Continuing with FIG. 8, it shows intake and exhaust valve timing, along with fuel injection, relative to engine position (once rotation begins). However, just is in any of the examples herein, more than one intake and/or exhaust valve may also be used, if desired.

In one example, if desired, in the event there is a variation in engine torque due to the increase or decrease in the number of strokes, it may be compensated for in various ways. For example, the amount of air charge in the cylinder changing the number of strokes (and/or the amount of air charge in other cylinders in the engine) can be adjusted (e.g., by adjusting valve opening and/or closing timing) to account for the torque variation. Also, in the alternative or in addition, ignition timing may also be adjusted to compensate for the torque disturbance.

Figure 9:
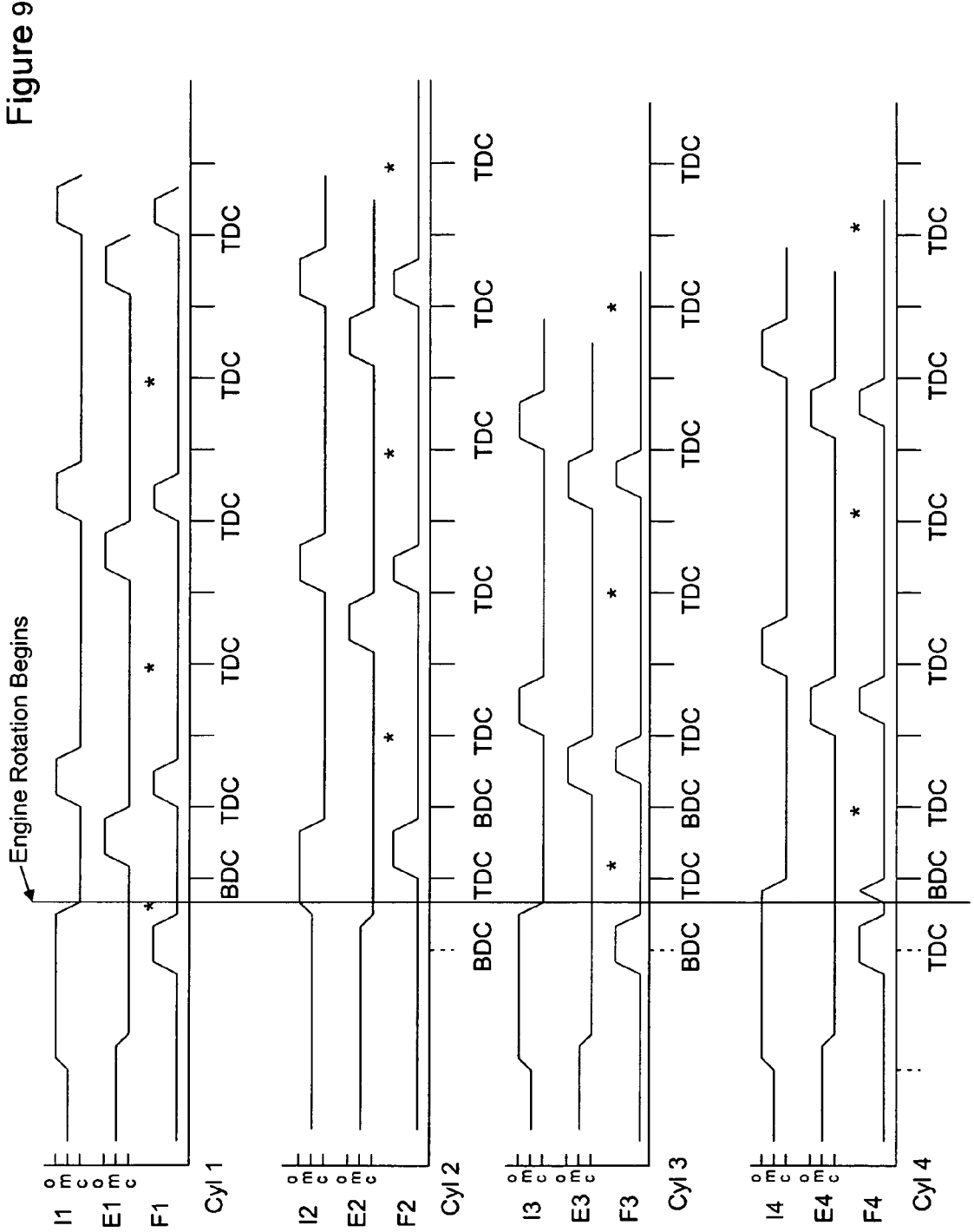

Referring now to FIG. 9, an example similar to that of FIG. 8 is shown, except that the cylinders are fired in the firing order of 1-3-4-2 from the start. Specifically, cylinder 4 is operated similar to that of FIG. 6, except that a second injection during the end of the intake stroke after rotation is utilized to deliver addition fuel to be mixed with any incoming air from. Further, there is no variation in the number of strokes in the cylinders.

Figure 10:
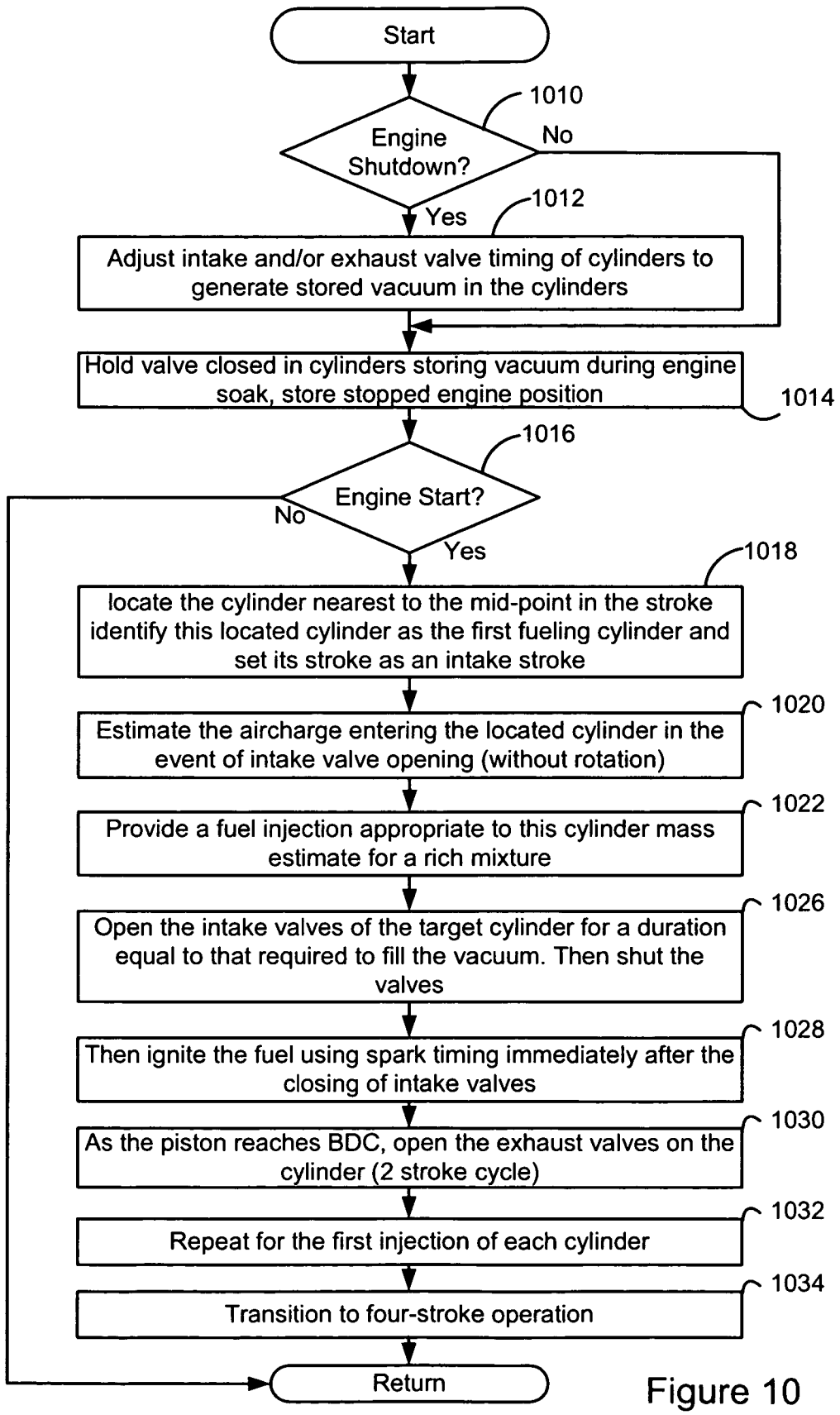
FIG. 10 is a flowchart of a method to control engine operation.

In an alternative embodiment that utilizing vacuum stored in one or more cylinders from a previous engine shutdown is now described with regard to FIG. 10. Specifically, in this embodiment, the engine is started without the starter using only electrically actuated valves. Such actuation may utilize less electrical power than that used by the starter and may remove the need for the starter during all engine starts. Although, as noted above herein, the starter may be retained to provide faster starts, or may be of a reduced size and/or capacity.

In this embodiment, described in part by the routine of FIG. 10, in 1010, the routine determines whether an engine shutdown is present. If so, the routine continues to 1012 where all or some of the cylinder valves of all or some cylinders are closed at the point of or near minimum or low charge volume during engine shutdown. This may occur after the command to shutdown the engine and at the end of the exhaust stroke for each cylinder, for example. This implies that the valve timing for each cylinder is offset by (720/# cylinder) degrees. After the engine has stopped rotating, all cylinder valves will be in a closed condition and have reduced trapped charge. Also, the stopped engine crank angle will be stored in 1014.

For a subsequent engine start identified in 1016, given that the engine crank angle position is known, the routine can then determine the cylinder that has a piston height nearest mid-stroke in the cylinder in the pull-down stroke (intake or power stroke) in 1018. For camless cylinder valves, the engine is may be set in one of two positions and thus there may be more than one cylinder in the intake/power stroke depending on the number of cylinders in the engine and the engine type. After locating the cylinder nearest to the mid-point in the stroke, the routine identifies this cylinder as the first fueling cylinder and sets its stroke as an intake stroke (which identifies the firing order and engine position). This cylinder can be set to have the maximum vacuum in the intake stroke.

Next, in 1020, the routine estimates the aircharge entering the cylinder in the event of intake valve opening (with the engine not rotating). This estimate may be based on the estimated vacuum built up in the cylinder, along with barometric temperature and pressure. In 1022, the routine then provide a fuel injection appropriate to this cylinder mass estimate for a rich or stoichiometric mixture using the associated port injector for that cylinder. Note, however, that a direct injector may also be used, where the sequencing of the fueling may be adjusted. In 1026, the routine then opens the intake valve(s) of the target cylinder for a duration equal to that required to fill the vacuum to a desired level, which may bring the cylinder pressure to atmospheric or below. After allowing air and fuel to enter the cylinder to the desired level, the valve(s) is closed. While the valves are open, the fuel and aircharge rush into the cylinder to replace the vacuum and possibly increase the mixing.

Continuing with FIG. 10, in 1028, the routine then ignites the fuel and air using spark timing immediately after or substantially close to the closing of intake valve(s). With a sufficiently rich mixture (PFI) or sufficiently rich mixture zone around the spark plug (DI), the mixture should combust. The combustion pressure will provide a downward force to the piston and rotate the crankshaft. As the piston reaches BDC, in 1030, the routine then opens the exhaust valves on the cylinder to generate a 2-stroke cycle. At this point (for the example of an 8-cylinder engine), the following cylinder will be at the midpoint of its intake stroke (2 stroke cycle). The procedure may then be repeated for each cylinder in 1032.

After some/all cylinders have gone through this initial firing, the engine will have accelerated to a rotational speed at which 4-stroke operation can be initiated in 1034. The remaining engine speed run-up can then follow 4-stroke operation with intake strokes inducting an air-fuel mixture, for example, without utilizing stored vacuum. In one alternative embodiment may include identifying all intake/power stroke cylinders at engine start and simultaneously actuating intake valves and injecting fuel for all those cylinders to fire the cylinders together. This can provide more initial torque to begin engine rotation, as noted above herein.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types. Also, the approaches described above are not specifically limited to a dual coil valve actuator. Rather, it could be applied to other forms of actuators, including ones that have only a single coil per valve actuator, and/or other variable valve timing systems, such as, for example, cam phasing, cam profile switching, variable rocker ratio, etc. Further still, various starting approaches may be used under different starting conditions. For example, starter assisted starts without pre-injection may be used under a first condition, starter assisted start with pre-injection may be used under a second condition, and starterless starts with pre-injection may be used under a third condition.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for controlling an engine during a start, the method comprising:

adjusting valve timing to adjust a level of vacuum trapped in a cylinder in response to an engine stop request;

after engine stop and before rotation of the engine begins, opening an intake valve of the cylinder storing the adjusted level of vacuum and injecting fuel from a port injector to the cylinder while the intake valve of the cylinder is opening;

closing the intake valve after completing the injection of fuel from the port injector before engine rotation; and performing a spark in the cylinder.

2. The method of claim 1 wherein adjusting valve timing to adjust the level of vacuum trapped in the cylinder includes closing all valves of the cylinder after an end of an exhaust stroke, and where the intake valve is opened and injecting fuel from the port injector are in response to an engine start request.

3. The method of claim 1 wherein the level of vacuum is trapped in the cylinder at and immediately preceding engine stop, further comprising during a first condition of the vacuum, starting injection of fuel from the port injector before the opening of the intake valve, and during a second condition of the vacuum, the second condition of the vacuum different from the first condition of the vacuum, starting the engine with an alternative starting sequence.

4. The method of claim 3 wherein the intake valve is closed before or after rotation of the engine begins, to vary an amount of cylinder charge in the cylinder.

5. The method of claim 1 wherein the intake valve opens to bring cylinder pressure to a level below atmospheric pressure, and wherein said spark is performed before or after rotation of the engine begins, depending on operating conditions.

6. The method of claim 1 where the intake valve is closed after fuel injection stops and before the spark is performed, and where the spark is provided for a first combustion event in the engine since engine stop and after engine rotation begins via a starter motor.

7. The method of claim 1 wherein an exhaust valve of the cylinder is closed from an open position before or during said injection of fuel.

8. The method of claim 1 wherein an exhaust valve of the cylinder is closed before performing said spark.

9. The method of claim 1 wherein said fuel injection is started once a fuel rail pressure reaches a threshold value.

10. The method of claim 1 wherein at least one valve of another cylinder is opened and at least another valve of another cylinder is closed before said spark is performed to reduce cranking torque and reduce gasses pumped as exhaust.

11. The method of claim 1 wherein said spark is performed before rotation of the engine begins.

12. A method for controlling an engine during a start, the method comprising:

during a first engine start:
transitioning an intake valve of at least one cylinder from a closed position to an open position before engine rotation and injecting a first amount of fuel from a port injector to the at least one cylinder during the transition of the intake valve from the closed position to the open position so that at least some fuel enters the at least one cylinder before rotation of the engine begins, the at least one cylinder in a first cycle since engine stop;

injecting a second amount of fuel from the port injector during the first cycle and after engine rotation begins and after injecting the first amount of fuel;

closing the intake valve after injecting the second amount of fuel; and performing a spark in the at least one cylinder to initiate a first combustion event in the at least one cylinder where the first and second amounts of fuel are combusted; and during a second engine start:
opening the intake valve of the at least one cylinder and starting a first injection of fuel from the port injector to the at least one cylinder since engine stop and after rotation of the engine, the first injection of fuel participating in a first combustion event in the at least one cylinder during the second engine start.

13. The method of claim 12 wherein before the first engine start and the second engine start, a vacuum is stored in the at least one cylinder via adjusting valve timing in response to an engine stop request, and where during the second engine start, a starter motor selectively assists in rotating the engine responsive to barometric pressure.

14. The method of claim 13 wherein said first start is during a warmer engine temperature than said second start, and where the vacuum is stored via adjusting the intake valve to open before minimum cylinder volume and then close at substantially minimum cylinder charge volume.

15. The method of claim 12 wherein one of said first and second start is selected based on an engine stopped position.

16. A system for an engine, comprising:
a first cylinder having an electrically actuated intake valve and an exhaust valve;
a first fuel injector coupled in an intake port of the first cylinder;
a controller including code stored in a non-transitory medium to trap a vacuum in the first cylinder at engine stop;
wherein said controller includes further code to inject fuel from the first fuel injector during opening of the electrically actuated intake valve of the first cylinder so that at least some fuel enters the first cylinder before rotation of the engine begins, close the electrically actuated intake valve of the first cylinder, and perform a spark in the first cylinder when vacuum in the first cylinder is sufficient to assist fuel induction into the first cylinder before rotation of the engine; and
wherein said controller includes further code to start the engine with an alternative starting sequence when vacuum in the first cylinder is not used to assist fuel induction into the first cylinder before rotation of the engine.

17. The system of claim 16 further comprising:
a second cylinder having an electrically actuated intake valve and an exhaust valve, and
a second fuel injector coupled in an intake port of the second cylinder,
wherein the controller includes code stored in the non-transitory medium to open the electrically actuated intake valve of the second cylinder and start injection of fuel from the second fuel injector coupled in the intake port of the second cylinder to the second cylinder so that at least some fuel enters the second cylinder before rotation of the engine begins; close the electrically actuated intake valve of the second cylinder; and perform a spark in the second cylinder to assist in increasing a speed of the engine during start.

18. The system of claim 17 further comprising:
a third cylinder having an electrically actuated intake valve and an exhaust valve, and
a third fuel injector coupled in an intake port of the third cylinder, wherein the controller includes further code to start an injection of fuel from the third fuel injector coupled in the intake port of the third cylinder to the third cylinder so that at least some fuel enters the third cylinder after rotation of the engine.

19. The system of claim 17 further comprising a starter motor that cranks the engine during conditions of low barometric pressure.

20. The system of claim 16 wherein the exhaust valve of the first cylinder is an electrically actuated exhaust valve.

21. A method for controlling an engine during a start, the method comprising:
   storing a vacuum in a cylinder at engine stop;
   when the vacuum has not decreased during and immediately preceding engine stop:
      before rotation of the engine begins, opening an intake valve of at least a first cylinder of the engine and starting injection of fuel from a first port injector coupled to the first cylinder so that at least some fuel enters the first cylinder during opening of the intake valve;
      closing the intake valve of the first cylinder;
      performing a spark in the first cylinder; and
      starting injection of fuel from a second port injector coupled to a second cylinder of the engine after rotation of the engine begins; and
   starting the engine with an alternative starting sequence when the vacuum has decreased during engine stop.

* * * * *